Inventors
Peter T. Heyl
Solon C. Shuford
George U. Parks, Jr.
By their Attorney
Carl E. Johnson.

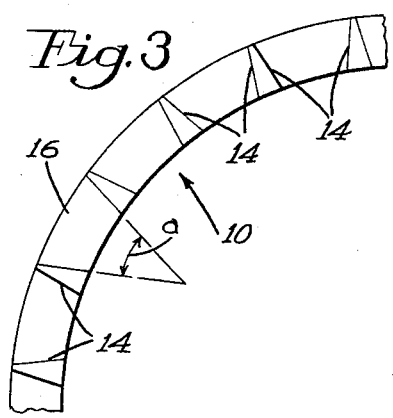
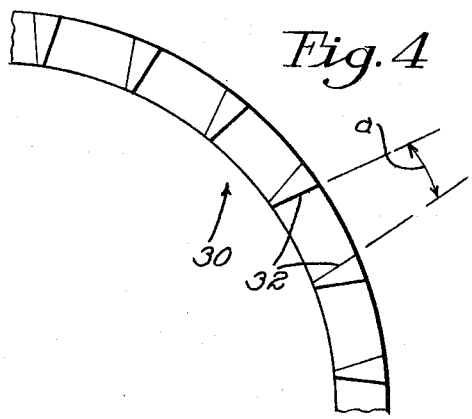
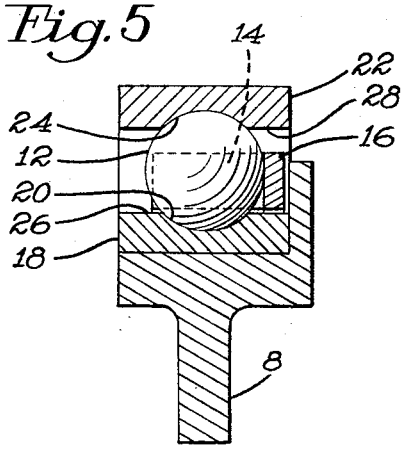
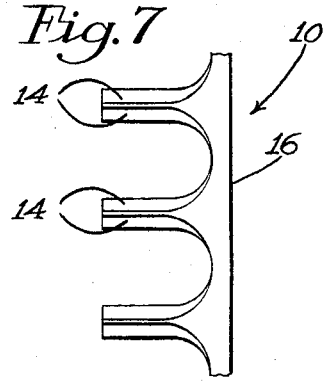
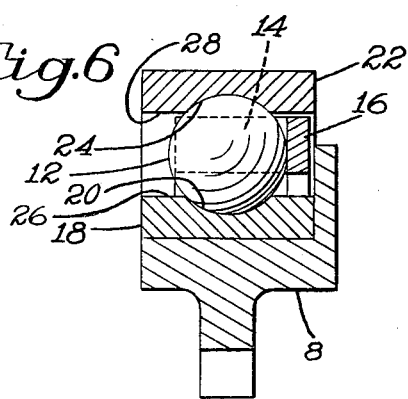

United States Patent Office 3,285,099
Patented Nov. 15, 1966

3,285,099
HARMONIC DRIVE BEARINGS
George U. Parks, Jr., Portland, Solon C. Shuford, Cromwell, and Peter T. Heyl, Durham, Conn., assignors, by mesne assignments, to United Shoe Machinery Corporation, Boston, Mass., a corporation of New Jersey
Filed Oct. 21, 1963, Ser. No. 317,647
5 Claims. (Cl. 74—640)

This invention relates to the provision of an improved bearing, and especially to one adapted for use in a power transmission of the type commonly called "harmonic drive" wherein a deflection wave is transferred to a nonrigid element. A transmission of this general construction is fully disclosed, for instance, in United States Letters Patent No. 2,906,143, issued September 29, 1959 in the name of C. Walton Musser.

By way of background information, a harmonic drive transmission customarily includes three concentric elements: a circular spline, a flexspline which may engage with the circular spline externally or internally, and a wave generator for radially deflecting the flexspline to effect such engagement at spaced circumferential points. Any one of the elements may serve as an input and one of the others may serve as an output member. While the present invention is useful in all types of harmonic drive, it has particular advantage in, and will be described with reference to, the construction wherein the wave generator is, in effect, an elliptoidal cam and the spline engagements caused thereby are 180° apart.

In conventional construction of antifriction bearings, rolling elements or balls are customarily uniformly spaced apart by an annular separator or cage as they roll within the circular raceways of the relatively rotatable, inner and outer rigid bearing race rings. The separator is usually journaled on one of the race rings or may ride on the balls themselves, and is formed with circumferentially spaced pockets for receiving and loosely guiding the respective balls in engagement with the raceways. Accordingly, the walls of the separator pockets generally extend radially and may be said to be cylindrical, but may partially correspond to curvature of the balls in order that they may partially support the separator upon starting rotation in their circular path. While such prior art bearings may often be used with reasonably satisfactory performance in harmonic type transmissions, i.e. those wherein a rotary wave of radial deflection produces mechanical leverage between concentric parts and the rolling elements consequently traverse a non-circular path, it is found that they do in fact incur detrimental friction build-ups and sudden releases. These probably result from inadequate and improper clearance of the rolling elements in the load region producing "pinching" or binding of the separator. Particularly under servo or other critical operating conditions, as in the hard vacuum environment of outer space, for instance, conventional separators may therefore produce unduly high peak torques and relatively higher starting friction resulting in undue wear as well as non-uniform operating characteristics for harmonic drive.

In view of the foregoing it is a primary object of this invention to provide an improved bearing cage and bearing for use in reducing friction torque in a harmonic drive type transmission. To this end, and in accordance with a feature of the invention, there is provided for use with a wave generator of a harmonic drive transmission, a bearing including a rigidly circular separator having circumferentially spaced, convergent-sided pockets for respectively receiving rolling elements such as bearing balls. In keeping with a further feature, the novel bearing assembly comprises with the just described separator, a shaped ring adjacent to the wave generator, and a radially deflectable ring for retaining the balls between the rings, the separator and the rings being concentrically related, and at least one of said rings being formed with a diametrical measurement related to a diameter of the separator to provide guidance for the separator at spaced localities. Preferably and as herein illustrated, both rings have a diametrical measurement selected in relation to the bore and outside diameter of the separator to provide separator guidance in localities 90° apart.

The above and other features of the invention will now be described with greater particularity in connection with illustrative embodiments thereof, and with reference to the accompanying drawings in which:

FIG. 3 is a view of a quarter section of the separator shown in FIG. 1, walls of the ball pockets being radial and converging inwardly;

FIG. 4 is a view similar to FIG. 3 but showing in contrast a portion of a separator for use with an externally mounted generator, the ball pockets having radial walls converging outwardly;

FIG. 5 is a section taken on the line V—V of FIG. 1 and illustrating the two points of major axis guidance for the separator;

FIG. 6 is a section taken on the line VI—VI of FIG. 1 and illustrating an additional two points of separator guidance provided at the minor axis; and FIG. 7 is a radial view of a portion of either of the separators of FIGS. 3 and 4, assuming it to have been straightened, looking toward the center of curvature in FIG. 3, or away from that center in FIG. 4.

Figure 1:
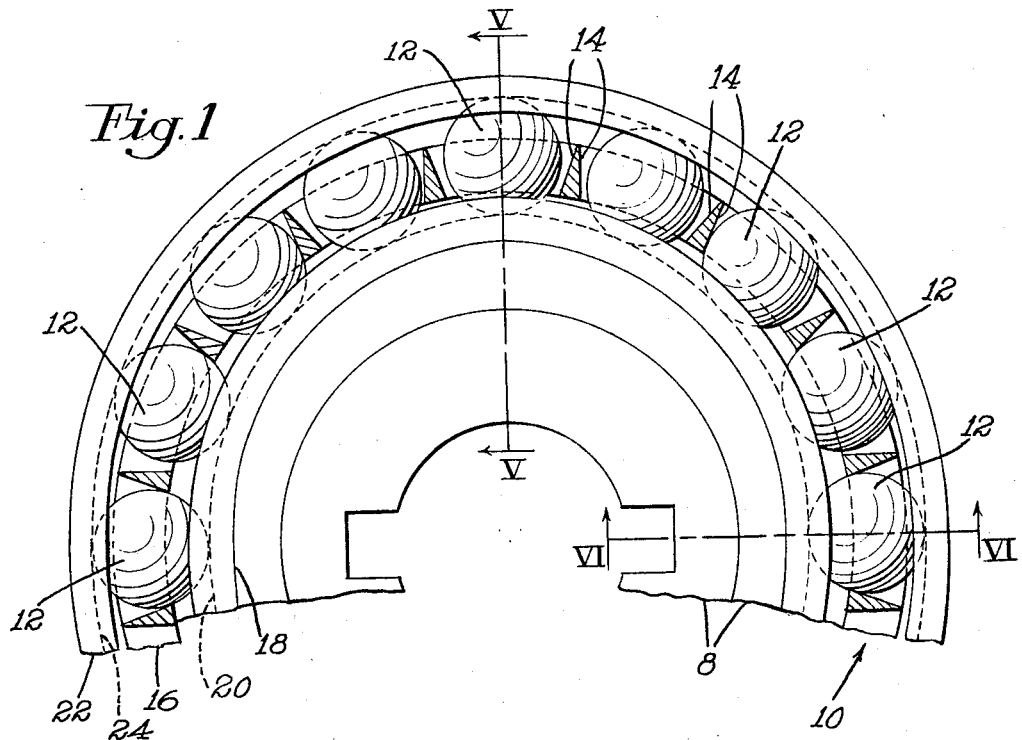
FIG. 1 is a view in elevation, partly in section and having a portion broken away, of a harmonic drive ball bearing and separator as adapted for use with an internal wave generator.

FIG. 1 illustrates a wave generator bearing for a harmonic drive transmission having an internal wave generator 8. The latter is elliptoidal, and concentric with the bearing, having its major axis in the vertical plane coincident with the section line V—V, and its minor axis in the horizontal plane coincident with the section line VI—VI. The bearing comprises an annular ball cage or separator 10 (FIGS. 1, 2, 3, 5 and 6), preferably of fairly rigid material, for instance of molded plastic such as is commercially available under the trade name "Delrin." Laminates, for instance that are known as "Synthane," have also been found advantageous. The separator is formed with circumferentially spaced, straight walled, similarly shaped pockets respectively having an axially open end, for respectively receiving radially displaceable bearing balls 12. Axially extending ball-engaging walls 14 of the separator pockets are radial and trapezoidal, in this instance converging toward the center of curvature, i.e. toward the wave generator for reasons hereinafter to be explained. The acute angle A (FIGS. 3 or 4) included by a pair of pocket walls 14 may vary depending roughly on the ratio of the transmission and precession of the balls to be accommodated, but usually is desirably on the order of 20–40° (30° is frequently satisfactory) and diminishing to zero degrees in a closed or annular connecting portion 16 (FIGS. 5–7). In some cases, too, it is found that the included angle may be substantially 0°, i.e. the walls may be essentially parallel or cylindrical and a large reduction in friction torque attained by merely providing diametrical sizing of the separator bore and its O.D. to insure 4-point guidance for the separator as hereinafter explained.

On the side of the separator adjacent to the wave generator 8, i.e. on the inside in this instance, is mounted a shaped bearing ring 18 (FIGS. 1, 5 and 6). This inner ring 18, originally circular, has a press fit on the wave generator and hence is correspondingly elliptoidal, as is a circumferentially grooved race 20 formed externally to accommodate the balls 12 as they roll. A deflectable outer ring 22 is internally formed with an elliptoidal, grooved race 24 for radially restraining the balls 12.

The separator is desirably 4-point guided by the race rings 18, 22 as will now be explained. Their grooves 20, 24 are of substantially equal and uniform depth. At the major axis, for instance as indicated by the section V—V (FIGS. 1 and 5), a pair of diametrically opposed balls 12 will have been radially displaced outwardly a maximum amount during operation, and these major axis balls are then in a radially loaded zone. It will be noted that both (one shown) are circumferentially midway of their respective pocket walls 14, i.e. they occupy positions of maximum clearance with respect to the separator walls 14. But in these major axis positions the separator is guided by having contacts or points of minimal clearance, 180° apart, with an external shoulder portion 26 (FIG. 5) of the internal ring. In a similar way, as indicated by FIGS. 1 and 6, at the minor axis diametrically opposed balls 12 are in a radially unloaded zone and have displaced inwardly a maximum amount. Both minor axis balls are then contacting, and centralized by, opposed trapezoidal walls 14 of their respective separator pockets, such separator contacts or points of minimal clearance occurring 90° from the loaded or major axis guidance points, and with an internal shoulder portion 28 of the external race ring 22.

Figure 2:
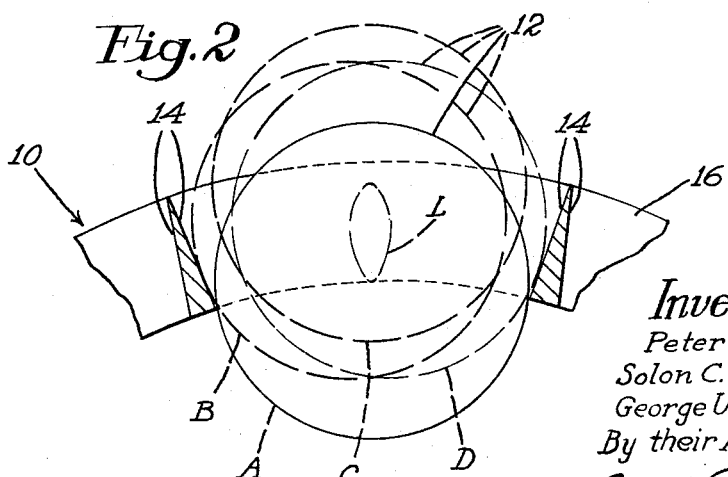
FIG. 2 is an enlarged detail view, partly in section, showing operating positions of a ball in FIG. 1 in relation to its separator pocket, the locus of the center of the ball being indicated.

Considering the dynamics involved with respect to the FIG. 1 arrangement, each ball 12 as it rolls traverses a generally elliptoidal path and has a tangential velocity tending to vary directly as its distance from the center of the ellipse. Consequently, the balls in a conventional separator having non-convergent walls and minimal guidance will, in a harmonic drive application, normally bind against them in at least two localities thereby loading the walls in opposite directions and causing detrimental skidding of the balls which results in further friction build-up. In contrast with such performance, consider the probable operation of our improved bearing with reference to FIGS. 1 and 2. The center of each ball moves, as indicated in FIG. 2, in each half orbit of the bearing, in a complete elliptoidal locus L within its pocket. This is to say that as a ball leaves the minor axis (position A of FIG. 2) and approaches the loaded region near the major axis (in this arrangement), the ball moves away from the center of the bearing and approaches the wider portion of its pocket, going to position B and thence to position C. As the ball thus rolls relative to the separator 10 which is rigidly circular, the ball finds additional clearance permitting it to "precess" without the usual binding due to pinching and camming of the separator by the balls. Clearly the 4-point guidance provided by the race rings 18, 22 aid in maintaining separator circularity. Then, as the ball approaches its minor axis or unloaded inner zone via position D, it has rolling contact with first one and then both inner margins of its pocket walls 14 again to become centered.

Performance tests at low speeds have particularly borne out the importance of having the separator (10) 4-point guided as above described to imporve concentricity control of its operating path. Such 4-point separator guidance is also found markedly advantageous when convergence of the pocket walls is diminished and they are even non-convergent or substantially cylindrical. For instance, decreases in maximum torque peaks at low speeds of as much as 70% have been demonstrated.

FIG. 4 illustrates a rigidly circular separator 30 adapted for use in a harmonic drive of the type having an elliptoidal wave generator mounted externally of a flexspline. In principle, operation of the separator 30, which has its radial pocket walls 32 converging toward the wave generator and away from the center of curvature, is the same as for the separator 10. The loaded zone now occurs at the minor axis of the separator 30, and the unloaded zone is at its major axis. As a ball enter the loaded region, it moves closer to the center of the bearing and toward the larger radial end of its separator pocket thereby obtaining the clearance needed to permit precession and avoidance of separator bind. With the separator 30, as with the separator 10, the provision of 4-point, or major and minor axis guidance by the use of suitable inner and outer ball-retaining race rings as described insures proper circumferential positioning of the pockets with respect to their relatively radially deflecting balls.

Having thus described our invention, what we claim as new and desire to secure by Letters Patent of the United States is:

1. A bearing for use in a harmonic drive transmission of the type including an internal elliptoidal wave generator, comprising an inner shaped ring fitted on the wave generator, a rigidly circular separator having circumferentially spaced pockets respectively provided with walls converging toward the wave generator, rolling-elements in the respective pockets, and a radially deflectable outer ring for retaining the rolling-element in their pockets and between the rings, the separator nad rings being concentric with the wave generator and at least one of the rings having a shoulder configuration in relation to the bore of the separator to provide guidance for the separator in the zones of one axis of the wave generator.

2. A bearing as set forth in claim 1 and further characterized in that one of the rings is formed with a shoulder having a diametrical measurement related to the bore of the separator to provide separator guidance in the radially loaded zones of the major axis, and the other ring is formed with a shoulder having a diametrical measurement related to the outer diameter of the separator to provide additional separator guidance in the radially unloaded zones of the minor axis.

3. A bearing for use in a harmonic drive tranmission of the type including an elliptoidal wave generator mounted externally of its flexspline, comprising a rigidly circular separator having circumferentially spaced pockets respectively formed with axially extending walls converging away from the center of the wave generator, rolling elements radially movable in the respective pockets, and a pair of spaced rings concentric with the separator and respectively formed with a race for the elements, at least one of the rings being radially deflectable and having a configuration with a diametrical measurement in relation to the outside diameter of the separator to guide it in the zones of one of the elliptoid axes of the wave generator.

4. A bearing for use in a harmonic drive transmission of the type including an elliptoidal wave generator mounted externally of its flexspline, comprising a rigidly circular separator having circumferentially spaced pockets respectively formed with axially extending walls converging away from the center of the wave generator, rolling elements radially movable in the respective separator pockets, and a pair of spaced rings for retaining the elements in said pockets, one of the rings being radially deflectable and having a configuration providing separator guidance at two major axis localities and the other ring having a configuration providing additional separator guidance at two minor axis localities.

5. In a harmonic drive transmission having a rotary wave generator and a flexspline, a bearing for imparting circumferentially to the flexspline the wave of radial deflection emanating from the wave generator, said bearing comprising a rigidly circulator separator having circumferentially spaced pockets formed by radial walls, rolling elements in the respective pockets and movable radially of their walls, and a pair of spaced rings concentric with the separator and the wave generator, each of the rings being formed with a race for the elements and one of the rings being radially deflectable, the diametrical measurement of the rings being selected in relation to that of the separator to provide guidance to the latter in the zones of both major and minor axes of the wave generator.

References Cited by the Examiner

UNITED STATES PATENTS

| | | | |
|---|---|---|---|
| 755,371 | 3/1904 | Knipe | 308—201 |
| 1,770,468 | 7/1930 | Ford | 74—805 |
| 3,088,333 | 5/1963 | Musser | 74—640 |

FOREIGN PATENTS

| | | |
|---|---|---|
| 354,350 | 6/1922 | Germany. |

DAVID J. WILLIAMOWSKY, *Primary Examiner.*

THOMAS C. PERRY, *Examiner.*